United States Patent [19]

Cartner

[11] Patent Number: 4,611,459
[45] Date of Patent: Sep. 16, 1986

[54] MOWING APPARATUS WITH IMPROVED REVERSIBLE CUTTING BLADE

[76] Inventor: Jack O. Cartner, 1005 N. 8th St., Cambridge, Ohio 43725

[21] Appl. No.: 739,226

[22] Filed: May 30, 1985

[51] Int. Cl.⁴ .................. A01D 55/18; A01D 35/28
[52] U.S. Cl. ..................... 56/12.7; 56/295; 56/15.5; 56/17.5
[58] Field of Search .............. 56/15.2, 15.5, 12.7, 56/17.5, 295

[56] References Cited

U.S. PATENT DOCUMENTS

| | | | |
|---|---|---|---|
| 2,319,464 | 5/1943 | Massa . | |
| 2,831,275 | 4/1958 | Kimsey et al. . | |
| 3,090,187 | 5/1963 | Livingston | 56/295 |
| 3,103,093 | 9/1963 | House | 56/295 |
| 3,135,079 | 6/1964 | Dunn . | |
| 3,319,407 | 5/1967 | Jordan et al. | 56/15.2 |
| 3,453,756 | 7/1969 | Schroeder . | |
| 3,507,104 | 4/1970 | Kline | 56/295 |
| 3,905,182 | 9/1975 | Geier | 56/13.6 |
| 4,308,713 | 1/1982 | James . | |
| 4,502,269 | 3/1985 | Cartner | 56/15.2 |

FOREIGN PATENT DOCUMENTS 1326900  8/1973  United Kingdom ............... 56/295

Primary Examiner—Gene Mancene
Assistant Examiner—John G. Weiss
Attorney, Agent, or Firm—Fay, Sharpe, Fagan, Minnich & McKee

[57] ABSTRACT

A mowing apparatus includes a tractor with a mowing unit attached to the tractor in varying operable positions with respect to the tractor. The mowing unit includes a pair of reversible blades which are rotated in a designated fashion about a pair of perpendicular first and second axes. Each blade has distinct cutting surfaces so that successive rotation of the blades presents a new cutting surface for continued operation and longer blade life. A stop mechanism is designed to prevent excessive rotation of the blades with respect to a mounting hub upon encountering a predetermined force.

12 Claims, 8 Drawing Figures

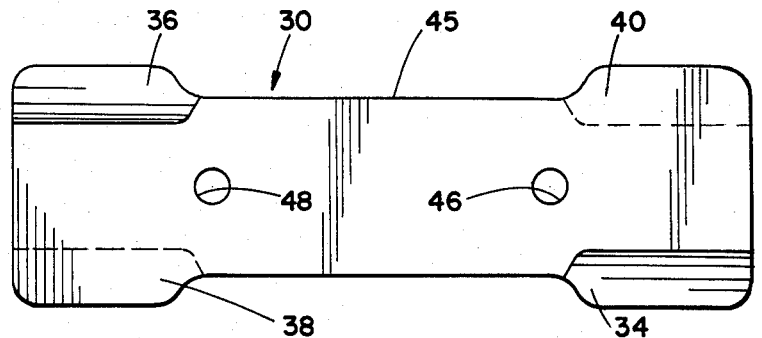
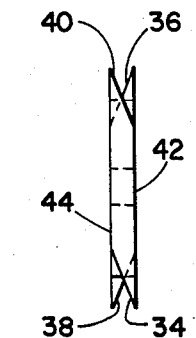
FIG. 3A          FIG. 3B
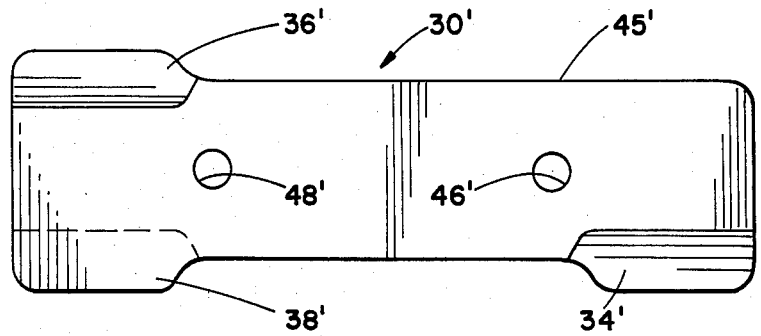
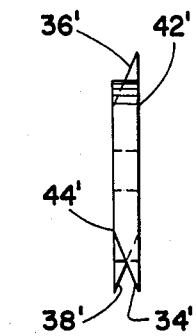
FIG. 4A          FIG. 4B
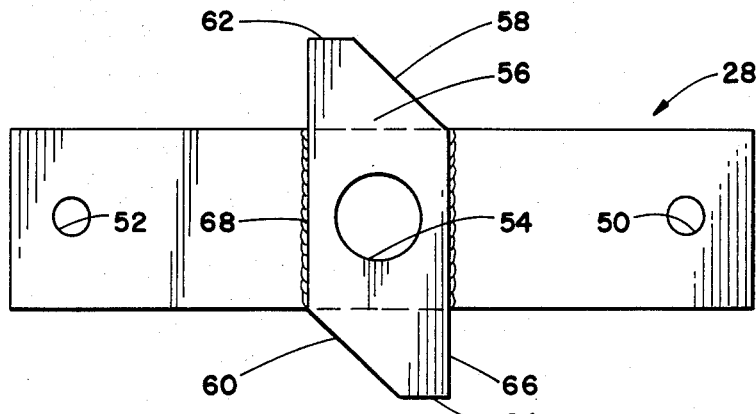
FIG. 5
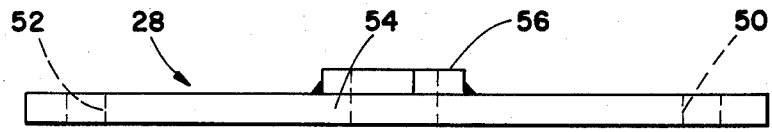
FIG. 6

MOWING APPARATUS WITH IMPROVED REVERSIBLE CUTTING BLADE

BACKGROUND OF THE INVENTION

This invention pertains to the art of mowing apparatus and more particularly to such apparatus using reversible cutting blades. The invention is particularly applicable to maintaining roadside grassy areas and will be described with particular reference thereto although it will be appreciated that the invention has broader applications such as trimming hedges, cutting overhead limbs and may be advantageously employed in these other environments.

Conventionally, mowing apparatus of this type employ a tractor or other prime mover which provides propulsion along the roadway. An arm assembly extends from the tractor and maintains a mowing unit in a desired position. Frequently, a berm of a highway slopes from the roadway level so that the mowing unit must be capable of a wide range of movement to accommodate such sloping surfaces.

A mowing unit includes a deck which houses a rotary blade assembly. The deck and blades are maintained in a generally parallel relationship with the surface area to be cut and operational controls located on the tractor allow adjustment as needed. The arm may be movable through the use of hydraulic control means, although it will be understood that comparable control means can be utilized.

The blade assembly is rotated at a high speed and the encompassing deck serves as a safety shield for the cut objects which would normally be thrown outwardly from the rotating blades with great force. The wide range of environmental uses of the mowing unit requires such a safety feature. For example, highway berms are frequently littered with cans, trash, and gravel as well as grass, plants and small trees which are to be cut. Once propelled to high speeds by the rotating blades, these objects could cause serious damage if not for the safety shielding provided by the deck.

Hedges are frequently disposed along side roadways and the versatile mowing unit can be angularly disposed from the horizontal to easily trim hedges and the like. In a similar manner, the mowing unit can be raised to an overhead position to cut overlying tree limbs. The movable arm positions the mowing unit in a multitude of positions.

The wide range of materials encountered by such a mowing apparatus necessitates the use of a durable blade. Even with the use of heat treated alloy steel blades, the abuse which the blades encounter can dull the cutting edge in a short period of time. In the past, the mowing apparatus was taken out of commission in order to replace the worn blades with newly sharpened blades. All of this took place at a great deal of time, labor, and expense.

Accordingly, the present invention is directed to a reversible blade which provides a simple and easy manner of presenting a sharpened cutting surface.

SUMMARY OF THE INVENTION

The invention includes the use of a forged blade that includes cutting surfaces provided on a number of edges. Apertures are preferably punched through the blade as a means for connecting the blade to a main hub assembly. The use of plural apertures facilitates reversibility of the blade so that the blade can be flipped and rotated in step wise progression to present separate cutting surfaces.

A centralized stop member is provided in another embodiment to stop rotation of the blades with respect to the main hub member upon encountering a predetermined force. The blades engage the stop member along an edge surface spaced from the cutting surface to effectively dampen the blades rotational movement without damaging an exposed cutting surface. Additionally, engaging the blade near the outer end of the blade, reduces the load imposed in the area of the attaching aperture.

It is therefore an object of this invention to provide a reversible blade assembly for use in a mowing apparatus.

It is a further object of this invention to reduce the amount of repair time necessary to substitute a new sharpened cutting surface for a worn cutting surface.

It is an object of this invention to provide a cutting blade which is two-way reversible.

It is also an object of this invention to provide a cutting blade which is four-way reversible.

It is an object of this invention to provide a centralized stop means which limits rotation of the reversible blade assembly with respect to the main hub upon encountering a predetermined force.

Lastly, it is an object of the present invention to extend blade life.

Still further objects and advantages of the present invention will become apparent to others upon reading and understanding the following detailed description of the preferred embodiment.

BRIEF DESCRIPTION OF THE DRAWINGS

The invention may take physical form in certain parts and arrangements of parts, a preferred embodiment which will be described in detail in this specification and illustrated in the accompanying drawings which form a part hereof and wherein:

FIG. 3A is a plan view of a reversible blade of the present invention.

FIG. 3B is an end view of a reversible blade of the present invention.

FIG. 4A is a plan view of an alternate reversible blade of the present invention.

FIG. 4B is an end view of an alternate reversible blade of the present invention.

FIG. 5 is a plan view of the main hub particularly illustrating the placement of the stop member.

FIG. 6 is a side view of the main hub particularly illustrating the placement of the stop mechanism.

DESCRIPTION OF THE PREFERRED EMBODIMENT

Figure 1:
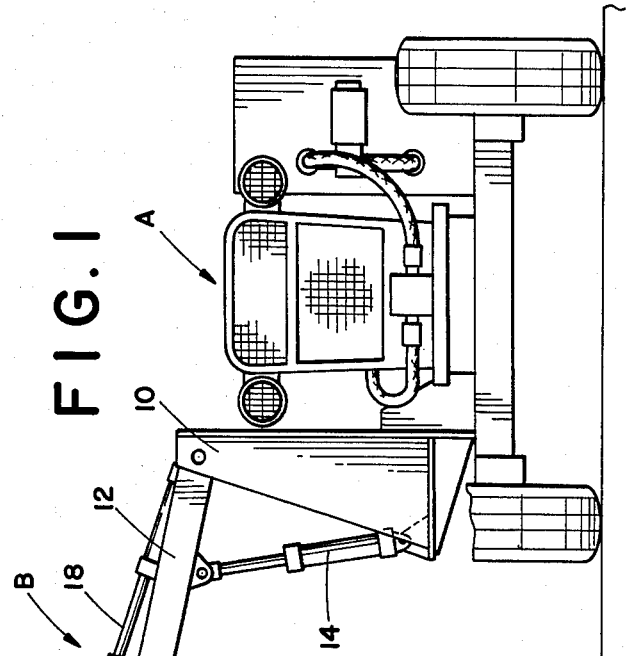
FIG. 1 shows a mowing apparatus in accordance with the present inventions.

Referring now to the drawings wherein the showings are for purposes of illustrating the preferred embodiment of the invention only and not for purposes of limiting same, the FIGURES show a reversible blade in a mowing unit adapted to be attached to a prime mover such as a tractor. The mowing apparatus includes a tractor A or any other type of prime mover which provides mobility for the mowing apparatus. An arm assembly B is connected at one end with the tractor and may be hydraulically actuated or actuated in any other conventional manner. The movable arm is connected at its other end to a mowing unit C. Alternatively, the mowing unit may be integrally attached with the tractor in a conventional manner. An operator seated in the tractor can drive along a roadway such that the mowing unit cuts the terrain along one side of the vehicle. Since the adjoining terrain many times constitutes sloped areas, the operator is provided with suitable controls (not shown) to control actuation of the movable arm B and place the mowing unit in a proper position.

In one preferred embodiment, a post 10 is mounted on the frame of the tractor by a vertical pivot assembly such that it can rotate around a vertical axis. The arm assembly B includes a first arm 12 which is pivotally connected with the post and a first control means 14 for controlling the first arm's position relative to the prime mover. As shown in FIG. 1, the first control means 14 is a hydraulic expansible chamber device such as a piston/cylinder device. The lower end of the piston/cylinder device is pivotally connected to the post 10 and also pivotally connected at its other end to the first arm 12. A second arm 16 is pivotally connected to the other end of the first arm 12. A second control means 18, such as the illustrated piston/cylinder device, is connected at another point on the post adjacent the first arm connection while its distal end is linked to the second arm 16. Although this is a preferred embodiment, it is contemplated that other comparable arrangements may be used with equal success.

The mowing unit C is pivotally connected with the outer end of the second arm 16. A third control means 20, shown as a piston/cylinder device, controls relative rotational movement of the mowing unit C with respect to the second arm 16. It is to be appreciated that as the relative positions of the first and second arms change, the orientation of the mowing unit relative to the earth may change accordingly. The third control means 20 adjusts the position of the mowing unit to maintain it in the proper orientation with respect to the ground. Alternatively, the third control means will pivot the mowing unit to a vertical position relative to the ground so that the sides of a hedge or the like may be appropriately trimmed. It is also contemplated that the relative positions of the control means will place the mowing unit in an overhead arrangement for trimming tree limbs and the like. The freedom of movement provided by the plural control means allows the mowing unit to be placed in a wide number of positions for numerous types of jobs.

Figure 2:
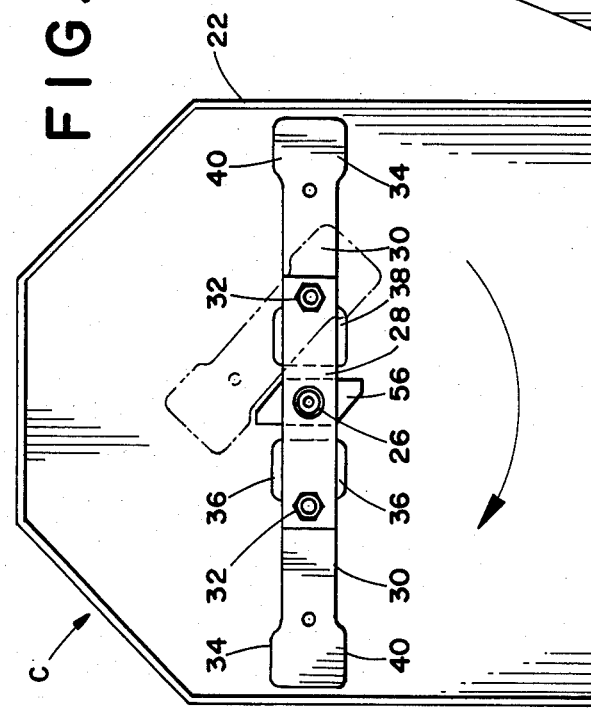
FIG. 2 is a bottom plan view of a mowing unit showing a rotary blade and surrounding deck.

The mowing unit C includes a deck 22 designed to house the cutting blades. A motor 24, hydraulic or otherwise, is secured to the top of the deck with a rotatable power shaft extending through the deck 22. As seen in FIGS. 1 and 2, the shaft 26 is centrally attached to a main mounting hub 28. The mounting hub 28 can be of a variety of shapes although preferably the mounting hub is a disc or an elongated plate member as seen in FIGS. 2 and 6. A pair of reversible blades 30 are mounted at opposite ends of the mounting hub by fasteners such as bolts 32 or any other conventional means. If a disc shaped mounting hub is utilized, the pair of reversible blades are diametrically mounted opposite one another. One skilled in the art will recognize the wide variety of mounting hub shapes which may be employed and understand that a greater number of blades can be used without departing from the breadth and intent of the subject invention.

The four-way reversible blade is particularly shown in FIG. 3A and is of an elongated structure with plural cutting surfaces placed at its corners, as will hereinafter be explained. The blade is forged of alloy steel which is heat treated after the cutting edges are formed at the blade corners. The blade itself is approximately ¾ of an inch thick and roughly four times as long as it is wide. The blade is rotated at approximately 1200-1300 rotations per minute which in turn generates a large momentum since the alloy blade weighs over 30 pounds. The momentum can be controlled by mounting the blade at various radial distances but is shown in the preferred embodiments as mounted at points approximately one-third the length of the blade.

Cutting surfaces 34, 36, 38, 40 are provided at the four corners of the blade. Each cutting surface is tapered from a first or bottom surface 42 to a second or top surface 44. The first and second surfaces 42, 44 are generally planar but may assume a variety of related planar configurations as understood by one skilled in the art. As seen in FIG. 3B, the first cutting surface 34 defines an acute angle with respect to the bottom surface 42. Similarly, the second cutting surface 36 also forms an acute angle with the bottom surface. The third 38 and fourth 40 cutting surfaces define acute angles with respect to the second or top surface 44 of the blade.

The cutting surfaces 34, 36, 38 and 40 extend outwardly from a narrower middle section 45 in a curvilinear fashion. As clearly seen in FIG. 3A, the first and third cutting surfaces 34, 38 define a leading edge of the blade which narrows in the middle section. Similarly, the second and fourth cutting surfaces 36, 40 define a trailing edge of the blade in which the middle section 45 is recessed with respect to the outermost edges of the cutting surfaces. The leading and trailing edges of the blade will change as the blade is reversed as will be described hereinafter.

A pair of apertures 46, 48, extend completely through the blade 30 and are designed to receive fasteners 32 for mounting the reversible blades to the mounting hub 28. Bolts or pins are illustrative of preferred types of fasteners although other conventional fasteners may be used. It is to be appreciated that a single elongated aperture may be used with equal success in mounting the blade 30 to the mounting hub 28 but the preferred embodiment illustrates a pair of apertures 46, 48 for reasons of symmetry, weight balancing and generated momentum forces. The fasteners hold the blades 30 on the mounting hub 28.

Reference to FIGS. 2 and 3A assists in envisioning the reversible nature of the blades 30. As shown in FIG. 2, the mounting hub 28 and blades 30 are rotating in a clockwise manner. The first cutting surface 34 of each blade 30 is positioned in a radially outermost leading edge position. After extended use and eventual wear of the first cutting surface 34, the blade may be reversed to present a second cutting surface for continued cutting operations. The second cutting surface 36 which is originally disposed at a radially innermost and trailing edge of the blade, is rotated into the radially outermost and leading edge position originally occupied by the first cutting surface 34. This rotation of the blade is achieved by unfastening the reversible blade 30 from the mounting hub 28 and rotating it 180° about an axis parallel to the axes of the first and second apertures 46, 48. This first axis is perpendicular to the first or bottom surface and the second or top surface of the blade. The blade is then fastened to the mounting hub 28 and continued operation of the mowing unit with a new cutting surface 36 may proceed. Extended use and eventual wear of the second cutting surface 34 of the reversible blades 30 requires a new cutting surface to be utilized. Flipping the blade over, i.e., rotating the blade 180° along a longitudinal axis extending perpendicular to the first axis, presents the third cutting surface 38 for exposure and use. The reversible blades 30 are unfastened, flipped over, and fastened again so that the third cutting surface 38 is thereby positioned in the radially outermost and leading edge of the assembly. Once again, the mowing unit is used for a period of time and eventual wear of the third cutting surface 38 occurs. The fourth, and as yet unused, cutting surface 40 is then rotated into the radially outermost and leading edge position. This last rotation of 180° is around the first axis which, as previously described, is parallel to the first and second apertures 46, 48. Extended use and eventual wear of the fourth cutting surface 40 eventually occurs and at this juncture a new four-way reversible blade may replace the completely used reversible blade.

As is evident, the four-way reversible blade provides an easy changeover from one cutting surface to another simply by unfastening the reversible blade 30 from the mounting hub 28. Each time the reversible blade is rotated 180° about its first axis, the bolt is alternatingly aligned with the first or second aperture, or vice versa. When the blade is flipped, the fastener is aligned with the same aperture with which it was previously aligned.

FIGS. 4A and 4B illustrate an alternative three-way reversible blade. Like numerals marked with a "prime" will designate like parts. A first cutting surface 34' is positioned diagonally from a second cutting surface 36'. A third cutting surface 38' may be disposed on the same side of the blade 30' as the first cutting surface 34' but axially spaced therefrom. A narrowed middle section 45' has a first aperture 46' and a second aperture 48' for mounting the three-way reversible blade to the mounting hub 28. The cutting surfaces 34', 36', 38' taper from a first or bottom surface 42' to a second or top surface 44'. As seen in FIG. 4B, the cutting surfaces 34', 36' define acute angles with respect to the bottom surface 42' while cutting surface 38' defines an acute angle with respect to the top surface 44'. In a manner similar to the four-way reversible blade, the three-way reversible blade is rotated 180° about a first axis parallel to the axes of the first and second apertures 46', 48'. In this way, a worn first cutting surface 34' is rotated from a radially outermost leading edge position to a radially innermost trailing edge position while an unused second cutting surface 36' is rotated in an exact opposite progression. The fastener is aligned with the first aperture 46' before rotation and with the second aperture 48' after rotation for connecting the blade to the mounting hub 28. The blade 30' may then be flipped over, i.e., rotated 180° along a longitudinal axis extending perpendicular to the first axis, presenting the third cutting surface 38' for exposure and use. The third cutting surface 38' is thereby positioned in the radially outermost and leading edge of the assembly.

As seen in FIG. 5 and FIG. 6, the mounting hub 28 has a pair of outer apertures 50 and 52 through which the fasteners pass to connect the reversible blades 30 to the mounting hub. A central aperture 54 extends through a stop mechanism 56 as well as the central portion of the mounting hub 28. The stop mechanism 56 is of a polygonal outline designed to engage a reversible blade.

When the hub and attached blades are rotating in a clockwise manner, it is not uncommon that an impediment of a certain size will obstruct further movement of the blade in a rotary manner. For example, a tree stump of a certain diameter would prevent further rotation of the blade in a clockwise manner. Due to the fastener connection of the reversible blade to the mounting hub, a predetermined force will allow the blade to rotate around the fastener and bypass the object which exerts a predetermined force. The reversible blade will rotate in a counterclockwise manner about the fastener and, without the stop mechanism 56, would continue to rotate in such a counterclockwise direction.

The central stop mechanism 56 engages the reversible blade 30 along its narrowed trailing edge middle section 45 or 45'. More specifically, the stop mechanism 56 has a pair of parallel, angled stop surfaces 58, 60. The stop surfaces 58, 60 are designed to engage the reversible blades along the middle section 45, 45' of the reversible blade 30. In this manner, the imposed forces on the blade will be at an area remote from the fastening aperture and prevent premature failure. Surfaces 62, 64 extend from the stop surfaces and align with the outwardly extending cutting surfaces of the blade 30 as seen in FIG. 2. A pair of connecting edges 66, 68 extend perpendicularly from surfaces 62, 64. The stop mechanism may be welded along the connecting edges 66, 68 to the mounting hub 28 as shown in FIG. 6.

Only one of the blades is shown in phantom abutting the stop mechanism after such a counterclockwise rotation. It is understood that the other reversible blade which is fastened in a similar manner would rotate in an identical fashion upon encountering a predetermined force. When the blades are free of the obstruction, the blades return to normal axially aligned positions. Alternatively, if the blade cutting surfaces is worn, the operator may unfasten the blade 30 from the mounting hub 28 and rotate the blade as explained above to present a sharpened cutting surface. The blade is then fastened securely to the mounting hub and the mowing apparatus is ready for further activity.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

The invention thus having been described, what is claimed is:

1. A mowing apparatus comprising:
   a prime mover;
   an arm assembly operatively connected at a first end with said prime mover;
   a mowing unit operatively connected with a second end of said arm assembly including:
   (a) a deck,
   (b) a motor means,
   (c) a rotatable shaft operatively connected with said motor means,
   (d) a mounting hub connected to said shaft,
   (e) a pair of reversible blades connected to said mounting hub, each blade having cutting surfaces disposed at corners of the blade whereby the blade life is increased by reversing the blade, (f) means for fastening said pair of reversible blades to said mounting hub, said fastening means defining a fastening axis, and, (g) means for stopping rotation of said blades about said fastening axis when said blades are displaced upon encountering a predetermined force, said stopping means positioned approximately midway between said reversible blade pair for engaging each of said blades at an area remote from said cutting surfaces.

2. The mowing apparatus as defined in claim 1 wherein said mounting hub is an elongated body centrally connected with said shaft.

3. A mowing unit comprising:

a motor means;

a rotatable shaft operatively connected with said motor means;

a mounting hub connected to said shaft;

at least one reversible blade secured to said mounting hub, the blade having plural cutting surfaces disposed at corners of the blade whereby the blade life is increased by reversing the blade;

means for fastening said reversible blade to said mounting hub, said fastening means defining a fastening axis;

means for stopping rotation of said blade about said fastening axis when said blade is displaced upon encountering a predetermined force, said stopping means centrally disposed on said mounting hub and engaging said blade at an area between said cutting surfaces and said fastening axis; and, a deck that houses said shaft, hub, and blade for preventing cut objects from being thrown unsafely beyond the mowing unit.

4. The mowing unit as defined in claim 3 wherein said mounting hub is an elongated body centrally located with said shaft.

5. The mowing unit as defined in claim 3 wherein said blade has a pair of apertures whereby said blade can be rotated approximately 180° for alternatingly connecting said blade to said hub by said fastening means.

6. The mowing unit as defined in claim 5 wherein said blade can be flipped over 180° for presentation of different cutting surfaces and increasing blade life.

7. A mower blade assembly comprising:

a mounting hub adapted for rotation with an associated shaft;

stop means centrally connected to said hub;

a pair of reversible mower blades connected to said mounting hub by fastening means defining a pair of fastening axes wherein each blade includes:

first and second spaced cutting areas on a first edge of each blade, said first and second cutting areas spaced by a blade middle section;

third and fourth spaced cutting areas on a second edge of each blade, said third and fourth cutting areas spaced by said blade middle section, whereby each blade is adapted for abutting engagement with said stop means along said middle section upon rotation about said fastening axis when encountering a predetermined force.

8. The mower blade assembly as defined in claim 7 wherein each blade further includes first and second apertures extending through each blade middle section, each blade alternately fastened to said mounting hub by said fastening means extending through said first and second apertures in selected reversible positions.

9. The mower blade assembly as defined in claim 7 wherein said cutting surfaces of each blade extend outwardly from said blade middle section.

10. The mower blade assembly as defined in claim 7 wherein said stop means includes first and second angular surfaces adapted for engaging said blades along said blade middle sections.

11. The mower blade assembly as defined in claim 10 wherein said stop means angular surfaces are disposed in parallel relation.

12. The mower blade assembly as defined in claim 7 wherein said stop means is welded to said mounting hub.

* * * * *